United States Patent [19]

Hays

[11] Patent Number: 5,050,785

[45] Date of Patent: Sep. 24, 1991

[54] BICYCLE RACK FOR FIFTH-WHEEL TRAILER

[76] Inventor: Gayle Hays, P.O. Box 394, Libby, Mont. 59923

[21] Appl. No.: 531,233

[22] Filed: May 31, 1990

[51] Int. Cl.$^5$ .............................................. B60R 9/00
[52] U.S. Cl. .................... 224/42.045 R; 224/42.003 B
[58] Field of Search ................ 224/42.03 B, 42.03 A, 224/42.03 R, 42.07, 42.41, 42.43, 42.45 R; 280/433; 211/17, 18, 19, 20, 21, 22, 5

[56] References Cited

U.S. PATENT DOCUMENTS

| | | | |
|---|---|---|---|
| 3,794,227 | 2/1974 | Stearns | 224/42.01 |
| 3,841,544 | 10/1974 | Berger | 224/42.03 B |
| 3,877,622 | 4/1975 | McLain | 224/42.03 B |
| 4,336,897 | 6/1982 | Luck | 224/42.03 B |
| 4,411,461 | 10/1983 | Rosenberg | 293/108 |
| 4,676,413 | 6/1987 | Began et al. | 224/42.03 B |
| 4,676,414 | 6/1987 | Deguevara | 224/42.03 R |

FOREIGN PATENT DOCUMENTS

| | | | |
|---|---|---|---|
| 1372017 | 8/1964 | France | 224/42.03 B |
| 2437323 | 9/1978 | France | 224/42.03 B |

*Primary Examiner*—Ernest G. Cusick
*Assistant Examiner*—Scott Flanders

[57] ABSTRACT

A bicycle rack for use when towing a fifth-wheel trailer, which generally comprises a structural support means, a means to attach and suspend one or more bicycles from said structural means and a means to attach and secure said structural support means to the hub apparatus of the fifth-wheel trailer such that the bicycle(s) are secured and suspended in front of the trailer and above the bed of the towing vehicle.

11 Claims, 3 Drawing Sheets

BICYCLE RACK FOR FIFTH-WHEEL TRAILER

FIELD OF THE INVENTION

This invention generally relates to a bicycle rack that attaches to a fifth-wheel trailer. More particularly, this invention relates to a bicycle rack which releasably attaches to the hub apparatus of the fifth-wheel trailer and releasably secures one or more bicycle(s) from the front end of the trailer.

BACKGROUND OF THE INVENTION

It is known in the art to attach bicycle racks to the front bumper and to the rear bumper of various types of recreational vehicles. Numerous means to attach the bicycles to the bumpers and other vehicle components have been used.

For many types of recreational vehicles, attaching the bicycle(s) to the front or rear bumper is not desirable. Attaching bicycle racks to the front bumper results in the bicycle(s) receiving a substantial amount of dirt, rocks and insects. Attaching the rack to the rear bumper can be difficult and cumbersome when other components of the recreational vehicle, such as the spare tire, must be avoided or worked around.

Persons towing fifth-wheel trailers experience these same problems. This invention greatly reduces or eliminates the forenamed problems by providing a bicycle rack which releasably attaches to the hub apparatus of the fifth-wheel trailer and suspends the bicycle(s) above the bed of the towing vehicle and in front of the trailer. This invention effectively keeps the bicycle(s) out of the way of the other components of the trailer and greatly reduces the amount of dirt and other debris which the bicycle(s) receives.

This invention is distinguished from prior art, individually or in combination thereof, by providing a bicycle rack which eliminates the problems relating to prior art, as discussed more fully herein.

SUMMARY OF THE INVENTION

This invention generally provides a bicycle rack for use when towing a fifth-wheel trailer and, more particularly, which releasably attaches to the hub apparatus of the fifth-wheel trailer and secures and suspends the bicycle(s) in front of said trailer.

This invention utilizes an attachment means to secure the bicycle rack to the hub apparatus of the fifth-wheel trailer in which two corresponding components of the attachment means are fastened together around the hub apparatus. In the preferred application of this invention, the two corresponding components are fastened around the hub apparatus by securely bolting the two components together around the hub apparatus. The main structural support means of the bicycle rack provides the structural support which fastens to the attachment means and to which the bicycle support arms are attached. This invention effectively secures and suspends the bicycle(s) in the desired location in front of the fifth-wheel trailer.

An object of this invention is to provide a bicycle rack for use when towing a fifth-wheel trailer which does not interfere with any of the functions of the trailer nor impede access to any trailer components. A feature of this invention is its means of attachment to the hub apparatus of the trailer and its main structural means for positioning the bicycle(s) in front of the trailer and above the bed of the towing vehicle. This feature gives this invention the advantage of eliminating the bicycle rack's interference with other trailer components by positioning the bicycle(s) in front of the trailer.

A second object of this invention is to provide a bicycle rack which positions the bicycle(s) such that the amount of dirt, rocks and insects the bicycle(s) receive is greatly reduced. This invention allows the bicycle(s) to be positioned relative to the towing vehicle and the front of the fifth-wheel trailer such that it has the advantage that the amount of dirt, rocks and insects the bicycle(s) receive is greatly reduced.

Another object of this invention is to provide a bicycle rack for use with fifth-wheel trailer which is relatively easy to install and does not have a large number of parts or complex design. The means of attachment to the fifth-wheel trailer and main structural support of this bicycle rack render it relatively easy to place on the fifth-wheel trailer.

Other and further objects of this invention will appear from the specification and accompanying drawings which form a part hereof. In carrying out the objects of my invention, it is to be understood that the essential features are susceptible to change in design and structural arrangement with the preferred embodiment being illustrated in the accompanying drawings and described herein, as is required.

BRIEF DESCRIPTION OF DRAWINGS

In the accompanying drawings, which form a part hereof.

DETAILED DESCRIPTION OF THE INVENTION

The bicycle rack as contemplated by this invention is for use when towing a fifth-wheel trailer and generally comprises a structural support means, a means to attach the structural support means to the hub apparatus of the fifth-wheel trailer, and a means to releasably secure one or more bicycles to the structural support means. There are variations to each element of this invention and a specific type of or configuration for each element is not necessary to practice this invention.

Many of the fastening, connection, and other means and components utilized in this invention are widely known and used in the field of the invention described, and their exact nature or type is not necessary for an understanding and use of the invention by a person skilled in the art or science, and will not, therefore, be discussed in significant detail.

Figure 1:
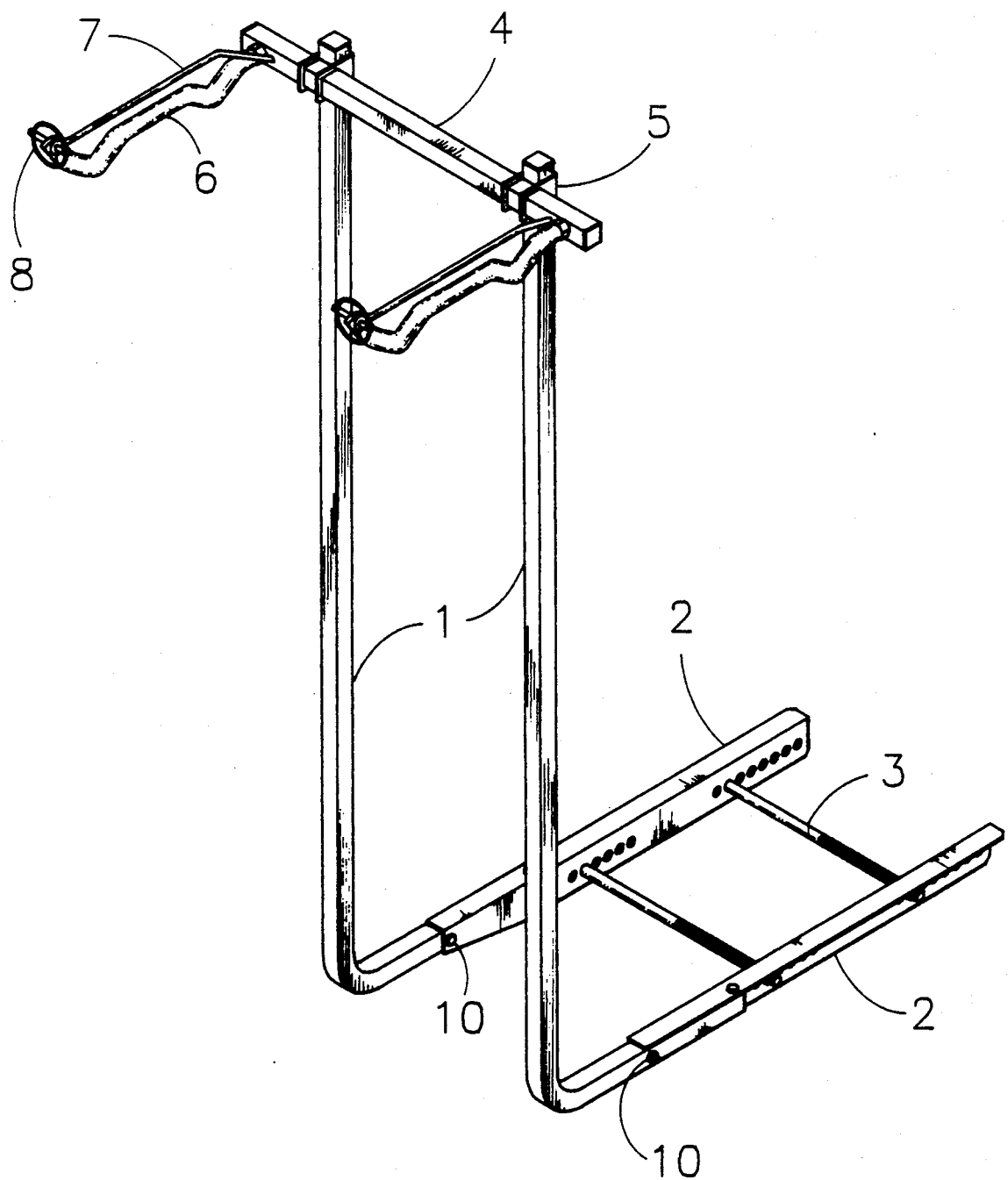
FIG. 1 is an orthogonal view of a bicycle rack.

FIG. 1 shows an orthogonal view of one application of the bicycle rack contemplated by this invention.

The structural support means of the application of this invention shown in FIG. 1 is comprised of two extruded square tubes 1 configured parallel to one another. The tubes 1 in this application are bent approximately radially at the lower end to result in the lower end of the tubes 1 being approximately parallel to the upper end. This invention contemplates that the angle between the upper and lower end of the tubes 1 can be varied to accommodate different types and configurations of fifth-wheel trailers.

The lower end of the tubes 1 are each securely fastened to angle iron 2. In this application, the tubes 1 are fastened to the angle iron 2 by bolts 10. The vertical side of the angle iron 2 has numerous circular holes along its length for insertion of long bolts 3 to fasten the two corresponding angle iron 2 sections together around the hub apparatus 9.

The bicycle rack is securely attached to the hub apparatus 9 of the fifth-wheel trailer by placing the two angle irons 2 parallel on both sides of the hub apparatus 9 and placing bolts 3 through the corresponding holes in the angle iron 2, and then securely tightening the bolts 3, thereby tightening the angle iron 2 around and to the hub apparatus 9 of the trailer.

FIG. 1 also shows the means to releasably attach one or more bicycles from the rack. This application of the means to releasably secure the bicycle(s) to the tubes 1 is comprised a crossbar 4 configured perpendicular to the structural support tubes 1 and adjustably attached to the structural support means 1 by U-clamps 5. The U-clamps 5 have apertures to receive the crossbar 4 and an adjustment and tightening screw to securely fasten the U-clamps 5 to the structural support tubes 1. The crossbar 4 can be moved upward or downward on the structural support tubes 1 to vertically position or reposition of the bicycle(s) relative to the fifth-wheel trailer. Attached to the crossbar 4 are two support arms 6, which in this application are comprised of steel rods bent and configured with two depressions to accommodate and suspend two bicycles. The end of the support arms 6 secured to the crossbar 4 is threaded and a threaded nut secures the support arms 6 to the crossbar 4.

A securing bar 7 is also attached to the crossbar 4 such that it can be rotated upward and is attached to the outward end of the support arm 6 by a pin bolt 8.

Figure 2:
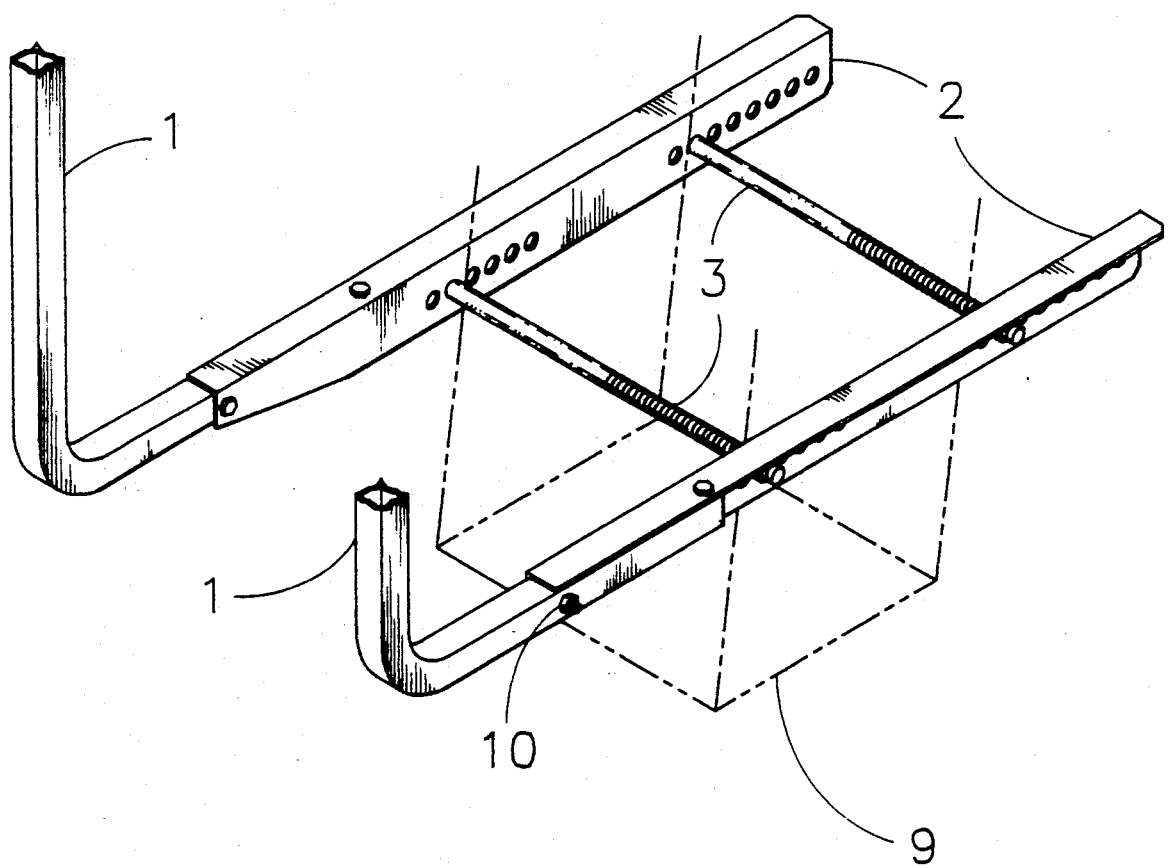
FIG. 2 is an orthogonal view of the attachment means for attaching the structural support means to the hub apparatus of a fifth-wheel trailer.

FIG. 2 shows a closer view of this application of the attachment means to the hub apparatus 9.

FIG. 2 further shows the hub apparatus 9 of the fifth-wheel trailer, which has flat parallel sides which run parallel to the length of the trailer. These flat sides are utilized as the mounting surface for the attachment means of this invention.

Figure 3:
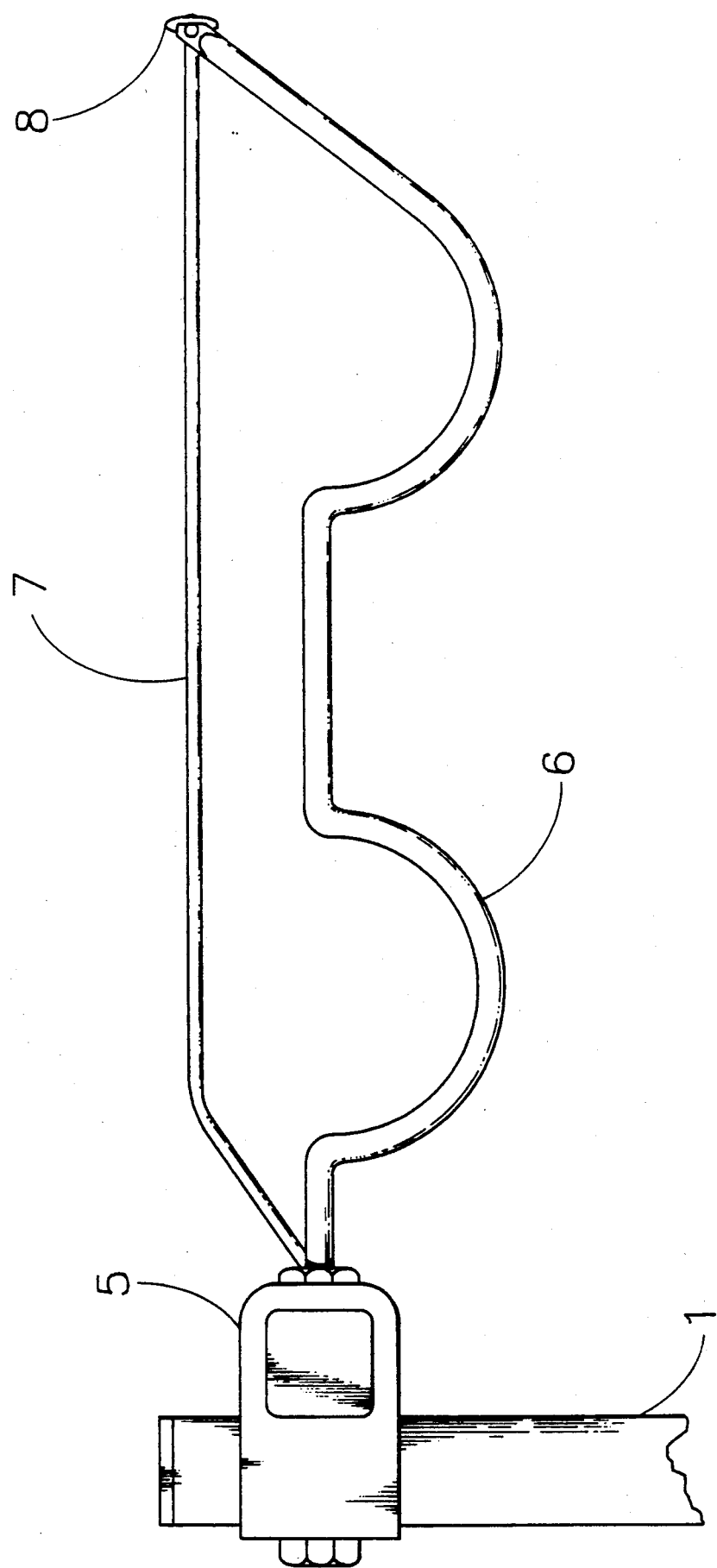
FIG. 3 is a side view of a means to releasably secure one or more bicycles to said structural support means.

FIG. 3 shows a closer side view of this application of the means to releasably secure the bicycle(s) to the rack.

While the preferred embodiment for the invention has been described in detail, those familiar with the art to which this invention relates will recognize various alternative designs for the invention and each element thereof, and will recognize embodiments for carrying out the invention as defined by the following claims. Changes and modifications in the specifically described embodiments can be carried out without departing form the scope of the invention which is intended to be limited only by the scope of the claims.

The invention claimed is:

1. A bicycle rack for non-permanent attachment to a hub apparatus on having opposing parallel side surfaces a fifth-wheel trailer, comprising:
   a structural support means;
   an attachment means comprising two parallel corresponding components fastened to said structural support means and adapted to be attached to said opposing parallel sides of a hub apparatus of a fifth-wheel trailer by fastening its two parallel corresponding components of said attachment means to one another around said hub apparatus such that the structural support means is securely fastened to the hub apparatus of the fifth-wheel trailer; and
   a means to releasably secure one or more bicycles to said structural support means.

2. A bicycle rack as recited in claim 1, in which said structural support means comprises two parallel components bent such that the lower ends of said parallel components are approximately perpendicular to the upper ends of said parallel components.

3. A bicycle rack as recited in claim 1 wherein said structural support means comprises two parallel components bent such that the lower ends of said parallel components are at an angle greater than 90 degrees and less than 180 degrees to the upper ends of said parallel components.

4. A bicycle rack as recited in claim 1 wherein said structural support means comprises two parallel components bent such that the lower ends of said parallel components are at an angle greater than 0 degrees and less than 90 degrees to the upper ends of said parallel components.

5. A bicycle rack as recited in claim 1, in which the means to attach said structural means to the hub apparatus of the trailer comprises said two parallel components bolted to one another such that they are securely fastened to and around opposite sides of the hub apparatus of the trailer.

6. A bicycle rack as recited in claim 5, in which the two parallel components bolted to one another are sections of angle iron.

7. A bicycle rack as recited in claim 1, wherein the means to releasably secure one or more bicycle(s) from the structural support means comprises a crossbar adjustably attached to said structural support means such that it can be positioned at one or more vertical levels on the structural support means and which further comprises two parallel support arms each attached at one end thereof perpendicular to the opposite ends of said crossbar and with one or more U-shaped depressions therein to receive a bicycle and prevent it from slipping along their length.

8. A bicycle rack as recited in claim 7, and which further comprises a means to releasably secure the bicycle(s) to said support arms through use of a securing bar which attaches at one end to said crossbar and at the other end to the other end of said support arm.

9. A bicycle rack for non-permanent attachment to a hub apparatus on having opposing parallel side surfaces a fifth-wheel trailer, comprising:
   a structural support means comprised of two parallel tubular components bent such that the lower end of said tubular components are approximately perpendicular to the upper end thereof;
   an attachment means comprising two parallel corresponding components fastened to said structural support means and adapted to be attached to said opposing sides of a hub apparatus of a fifth-wheel trailer by fastening its two parallel corresponding components of said attachment means to one another around said hub apparatus such that the structural support means is securely fastened to the hub apparatus of the fifth-wheel trailer; and
   a means to releasably secure one or more bicycles to said structural support means which comprises a crossbar adjustably attached to said structural support means such that it can be secured at one or more vertical positions on the support means and which further comprises two parallel support arms each attached at one end thereof perpendicular to the opposite ends of said crossbar and with one or more U-shaped depressions therein to receive a bicycle and prevent it from slipping along their length.

10. A bicycle rack as recited in claim 9, and which further comprises a means to releasably secure the bicycle(s) to said support arms through use of a securing bar which attaches at one of its ends to said crossbar and at its other end to the other end of said support arm.

11. A bicycle rack as recited in claim 9 wherein said structural support means comprises two parallel tubular components bent such that the lower ends of said parallel tubular components are at an angle greater than 90 degrees and less than 180 degrees to the upper ends thereof.

* * * * *